United States Patent [19]

Montoro et al.

[11] Patent Number: 5,311,032
[45] Date of Patent: May 10, 1994

[54] STORAGE PHOSPHOR READER DIAGNOSTICS

[75] Inventors: James C. Montoro, Rochester; David L. Modney, Fairport, both of N.Y.

[73] Assignee: Eastman Kodak Company, Rochester, N.Y.

[21] Appl. No.: 979,992

[22] Filed: Nov. 23, 1992

[51] Int. Cl.$^5$ ................. G03B 42/00; G06K 9/20; G01N 23/04
[52] U.S. Cl. ........................................ 250/584
[58] Field of Search ................ 364/413.13; 250/327.2 D, 327.2 E, 327.2 F, 327.2 G, 327.2 H, 327.2 I, 327.2 J, 327.2 K, 584, 585, 586, 588, 589, 581; 378/99

[56] References Cited

U.S. PATENT DOCUMENTS

| | | | |
|---|---|---|---|
| 31,847 | 3/1885 | Luckey | 250/327.2 |
| 4,723,074 | 2/1988 | Kimura | 250/327.2 |
| 4,725,694 | 2/1988 | Auer et al. | 379/99 X |
| 4,809,697 | 3/1989 | Causey, III et al. | 128/419 PT |
| 4,931,641 | 6/1990 | Ohgoda | 250/327.2 |
| 4,955,067 | 9/1990 | Shimura | 250/327.2 |
| 5,014,045 | 5/1991 | Shimura et al. | 250/327.2 X |
| 5,021,770 | 6/1991 | Aisaka et al. | 378/99 X |
| 5,151,592 | 9/1992 | Boutet et al. | 250/228 |

FOREIGN PATENT DOCUMENTS 4-51229  2/1992  Japan ................ 250/327.2

*Primary Examiner*—Constantine Hannaher
*Assistant Examiner*—Edward J. Glick
*Attorney, Agent, or Firm*—William F. Noval

[57] ABSTRACT

A laser imaging apparatus, such as a storage phosphor reader, which converts a latent x-ray image stored in a storage phosphor into an x-ray image signal. Diagnostic routines for the storage phosphor reader are controlled by means of a touch screen monitor which displays a diagnostic screen having a plurality of selectable buttons.

8 Claims, 5 Drawing Sheets

STORAGE PHOSPHOR READER DIAGNOSTICS

FIELD OF THE INVENTION

This invention relates in general to laser imaging systems and more particularly to storage phosphor systems in which a latent x-ray image is recorded in a storage phosphor. A storage phosphor reader converts the stored latent x-ray image into an x-ray image signal. Diagnostic routines for the storage phosphor reader are controlled by means of a diagnostic touch screen monitor which displays a diagnostic screen having a plurality of selectable buttons.

BACKGROUND OF THE INVENTION

In a storage phosphor imaging system as described in U.S. Pat. No. Reissue 31,847, reissued Mar. 12, 1985, to Luckey, a storage phosphor is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a helium neon gas laser or diode laser. Upon stimulation, the storage phosphor releases emitted radiation of an intermediate wavelength, such as blue light, in proportion to the quantity of x-rays that were received. To produce a signal useful in electronic image processing the storage phosphor is scanned in a raster pattern by a laser beam deflected by an oscillating or rotating scanning mirror or hologon. The emitted radiation form the storage phosphor is reflected by a mirror light collector and detected by a photodetector such as a photomultiplier to produce an electronic image signal. Typically the storage phosphor is translated in a page scan direction past the laser beam which is repeatedly deflected in a line scan direction perpendicular to the page scan motion of the storage phosphor to form a scanning raster pattern of a matrix of pixels.

As with all radiographic equipment, storage phosphor readers require periodic maintenance to correct equipment failure and to prolong the reader's operating life. Because the storage phosphor reader is not being used during maintenance periods, decreased productivity and reduced billable procedures results.

There is thus a problem in keeping maintenance time and cost to a minimum in order to increase productivity and billable procedures of a storage phosphor reader.

SUMMARY OF THE INVENTION

According to the present invention there is provided a solution to these problems in the prior art of maintenance of storage phosphor readers. The storage phosphor reader apparatus of the present invention comprises:

a laser for producing a laser beam;

scanning means for scanning said laser beam in a line scan direction across a storage phosphor which stores a latent x-ray image to produce an emitted light x-ray image;

translating means for translating said storage phosphor in a page scan direction perpendicular to said line scan direction of said laser beam;

storage phosphor loading means for loading and unloading a storage phosphor relative to said translating means;

photodetector means for detecting said emitted light x-ray image and for producing a corresponding x-ray image signal;

erasing means for erasing said storage phosphor after it is scanned; and control means for controlling said laser, said scanning means, said translating means, said storage phosphor loading means, said photodetector means and said erasing means,; wherein said control means includes touch screen means for providing a user interface to said control means, said touch screen means displaying a diagnostic screen having buttons which are user selectable to initiate diagnostic routines for said laser, said scanning means, said translating means, said storage phosphor loading means, said photodetector means and said erasing means.

DESCRIPTION OF THE PREFERRED EMBODIMENTS

Figure 1:
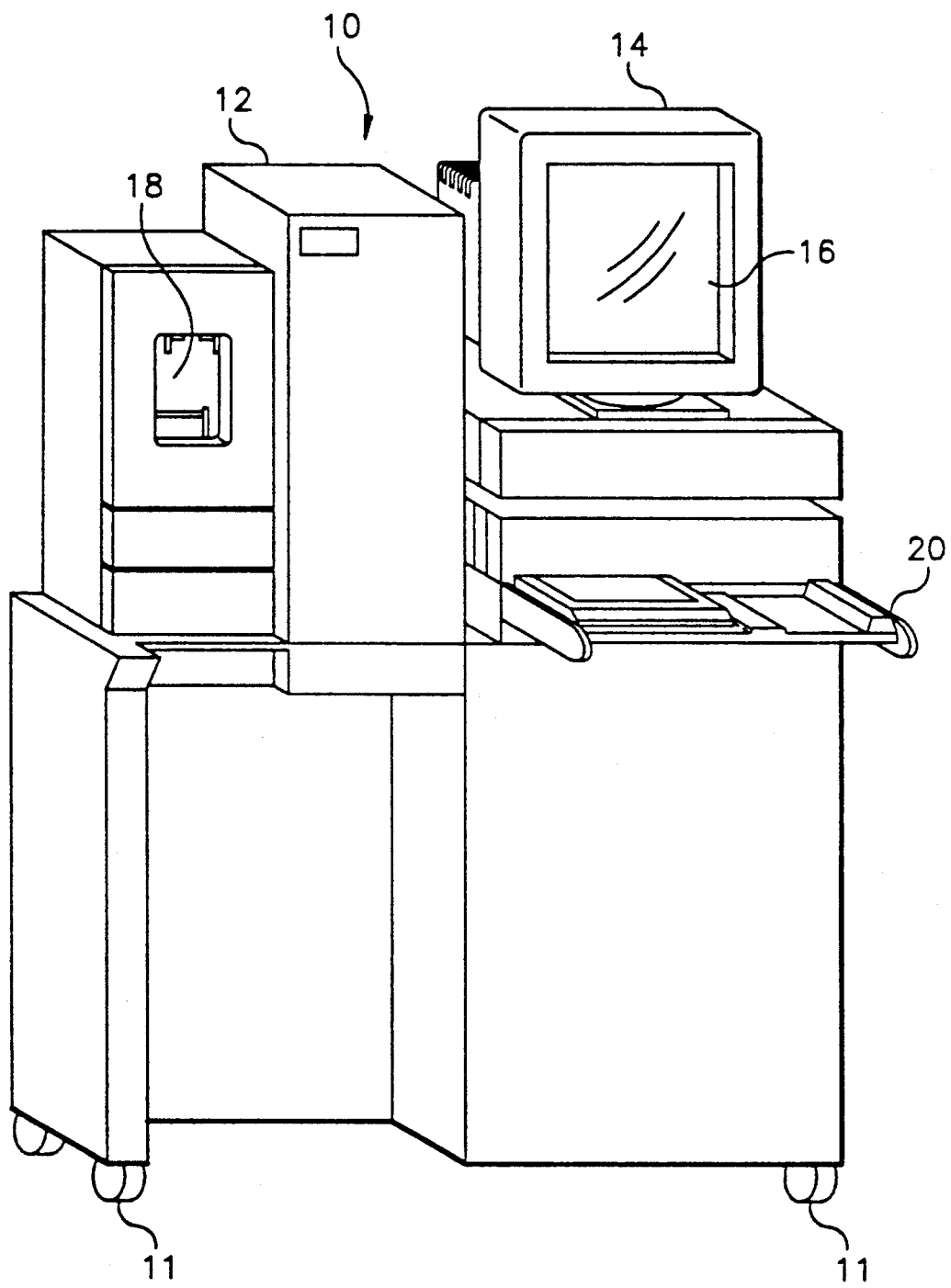
FIG. 1 is a perspective view of a storage phosphor reader incorporating the present invention.

Referring now to FIG. 1, there is shown a storage phosphor reader 10 incorporating an embodiment of the present invention. Reader 10 is mounted on casters 12 for easy portability in a radiology environment. Reader 10 includes a multiunit housing 12 housing the components of storage phosphor reader 10 and a video monitor 14 having a touch screen 16 supported on housing 12. Housing 12 also includes a bar code reader docking station 18 for docking a hand held bar code reader and for transferring data from the hand held bar code reader to storage phosphor reader 10. Reader 10 includes storage phosphor cassette load platform 20 which receives cassettes containing storage phosphor plates which are to be read or erased by reader 10.

In general, storage phosphor reader 10 processes images captured on a storage phosphor plate using conventional radiographic equipment. Reader 10 then scans the storage phosphor plate and converts the latent x-ray image therein into an electrical x-ray image signal which can be viewed on monitor 14. The scanned image is then delivered to a receiving device (such as a quality control station, laser printer or archival device) for image processing, image enhancement, viewing, printing and/or storage. The storage phosphor reader 10 is operated using touch screen 16 which also displays the image. The storage phosphor plates which are used to hold the unexposed x-ray images are mounted in standard size x-ray cassettes of different sizes. These storage phosphor plates can be erased and reused repeatedly. The optional hand held bar code reader can be used to collect exam information which is transferred to the storage phosphor reader 10 and associated with the scanned images when it is mounted in download station 18.

In general, the storage phosphor reader is usable in the storage phosphor patient identification system disclosed in commonly assigned U.S. patent application Ser. No. 963,036, filed Oct. 19, 1992, inventor Good et al. As disclosed in that patent application, the storage phosphor patient identification system is as follows:

When a radiology technologist receives a request for an x-ray examination of a patient, the technologist exposes a body part of the patient to an x-ray which is stored as a latent x-ray image in the storage phosphor plate of a storage phosphor cassette. Several images may be taken at this time. Using the optional portable bar code reader the technologist scans the patient identification bar code label and the label on the storage phosphor cassette. Exam related information can be scanned from a bar code chart that is usually attached to the portable x-ray generator. Such information includes body part type, x-ray exposure conditions, position of patient and the like.

The image is now captured by the technologist performing the x-ray exam using the cassette containing the storage phosphor plate from which the bar code label was scanned. When the x-ray exam is complete the technologist takes the storage phosphor cassette to storage phosphor reader 10 to be processed. If the optional bar code reader is used, the technologist transfers the patient identification and exam information by inserting the bar code reader into the bar code reader station 18 on the front of reader 10. The scanned information is then transferred to the control system of the storage phosphor reader 10. The technologist then loads the cassette containing the exposed storage phosphor plate into reader 10 by loading on load platform 20. Scanning is initiated when the technologist presses a start button on touch screen 16.

Inside storage phosphor reader 10 the storage phosphor plate is extracted from the cassette and scanned with a laser light. As the plate is scanned, the image appears on touch screen 16 as it is being scanned. After the scanning is complete the image is sent to a receiving device where it can be tonescaled, enhanced, viewed, printed and/or stored. After the storage phosphor plate has been completely scanned it is erased by exposure to light which removes any remnants of the image. The storage phosphor reader 10 then places the storage phosphor plate back into its cassette. The technologist can now remove the cassette from reader 10 to be reused for another exam.

Figure 2:
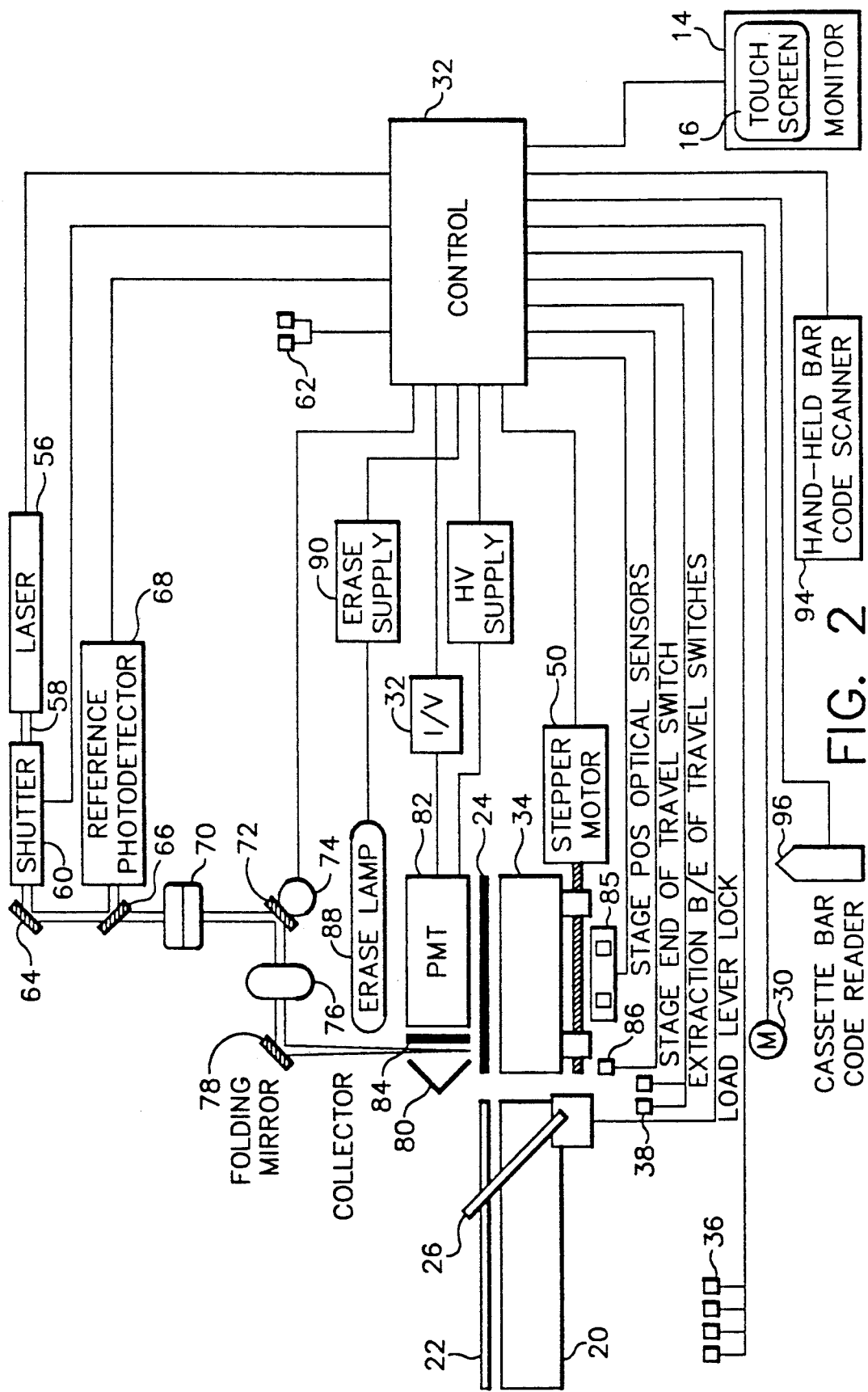
FIGS. 2 and 3 are respectively a partially diagrammatic, partially schematic view and a perspective view of the components of the storage phosphor reader of FIG. 1.
Figure 3:
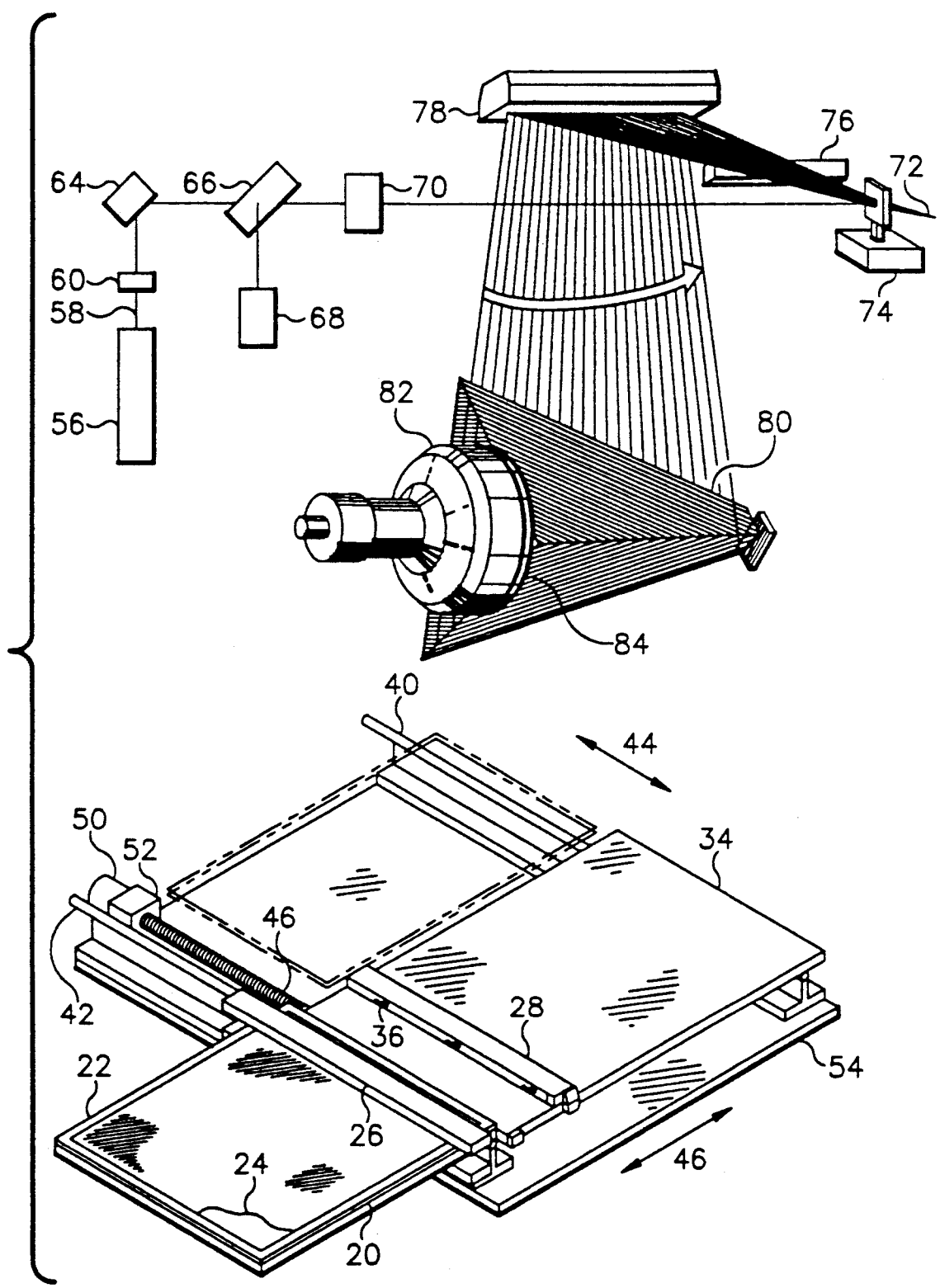

Referring now to FIGS. 2 and 3 there will be described in greater detail a preferred embodiment of storage phosphor reader 10 incorporating the present invention. As shown, a storage phosphor cassette 22 containing a storage phosphor plate 24 is loaded on cassette load platform 20. Load lever 26 is rotated to clamp cassette 22 in place and unlatches the cassette 22 to permit extraction of storage phosphor plate 24 therefrom. Storage phosphor plate 24 is extracted from cassette 22 by extraction device 28 (FIG. 3) which is actuated by extraction motor 30 under software control from control 32. Control 32 includes standard computer components such as a microprocessor, a magnetic disk drive for storing images, software applications and computer operating system and input and output devices to communicate with the components of reader 10. Such microcomputer systems are well known in the art and will not be described in detail herein.

Extraction device 28 is slidably mounted on translation stage 34 and includes hooks 36 which engage storage phosphor plate 24. Extraction device 28 extracts storage phosphor plate 24 from cassette 22 onto translation stage 34. As the storage phosphor plate 22 is loaded onto stage 34 it passes over plate size detecting switches 36 which detect the plate size and communicate this information to control 32 (as will be described in greater detail later). There are sufficient plate size detectors 36 to detect the different plate sizes that can be processed by reader 10. The beginning and end of travel of extraction mechanism 28 are sensed by extraction begin and end travel switches 38 connected to control 32.

Translation stage 34 is slidably mounted on rails 40 and 42 for movement in opposite directions 44 which are perpendicular to the directions 46 of loading and unloading of plate 24 relative to translation stage 34. Translation stage 34 is driven by a screw drive mechanism 48 actuated by stepper motor 50 mounted on block 52. Rails 40 and 42 are supported by frame member 54 of reader 10.

The laser scanning components will now be described. Reader 10 includes a laser 56 (such as a helium neon gas laser) for stimulation of storage phosphor plate 24. Laser 56 produces a laser beam 58 which passes through a shutter 60. Shutter 60 is controlled by digital signals received from control 32. Shutter 60 closes with activation of cover interlock switches 62 which detect closure of the housing 12 covers.

Beam 58 is reflected off mirror 64 and passes through beam splitter 66 which directs a portion of the laser beam 58 to reference photodetector 68. Following the beam splitter 66 laser beam 58 passes through collimator 70. The collimated laser beam is deflected by an oscillating scan mirror 72 driven by galvanometer 74 under the control of control 32. Scan mirror 72 provides the line scan raster motion of the laser beam 58. Galvanometer 74 drives mirror 72 with a constant angular velocity.

An f-theta lens 76 produces a flat field of focus and constant linear velocity at the plane of storage phosphor plate 24. Folding mirror 78 directs the laser beam through light collector 80 onto storage phosphor plate 24. Collector 80 may be of the type disclosed in commonly assigned U.S. Pat. No. 5,151,592, issued Sep. 29, 1992, inventors Boutet et al. The stimulating light of laser beam 58 causes the storage phosphor in plate 24 to emit light (blue) which is a function of the x-ray image stored in plate 24. Collector 80 directs this emitted light onto photomultiplier tube (PMT) 82. A filter 84 in front of the face of PMT 82 blocks the scattered stimulating laser light and passes the light emitted by storage phosphor plate 24. Once a storage phosphor plate 24 is on translation stage 34 a scan is begun. Movement of translation stage 34 in the direction of arrow 44 is under software control of control 32. Control 32 sends commands to stepper motor 50 to initiate a scan, to start translation stage 34, to start galvanometer 74 and to turn on PMT 82. From the home position of stage 34 the control 32 counts stepper motor 50 steps to the point where the storage phosphor plate 24 is under collector 80. At this point acquisition of the latent x-ray image on storage phosphor plate 24 begins. At the end of the scan (determined by the number of scan lines for the appropriate storage phosphor plate size), PMT 82 and galvanometer 74 are turned off and translation stage 34 is returned to the home position which is determined by one of the stage position optical sensors 85. A stage end of travel switch 86 is located just beyond the position of optical sensors 84 to prevent damage in case of failure of optical sensors 84.

Immediately after translation stage 34 reaches the home position, erase lamp 88 is turned on by actuation of erase power supply 90 under software control from control 32. Following a predetermined erase time (such as 30 seconds) erase lamp 88 is turned off and extraction mechanism 28 returns storage phosphor plate 24 in the direction of arrow 46 to storage phosphor cassette 22. When the extraction mechanism 28 trips the extraction end of travel switch 38, the lock for load lever 26 is released. The storage phosphor reader user can now rotate load lever 26 and remove cassette 22 from loading platform 20.

During the scan of storage phosphor plate 24 an emitted x-ray light image is converted by PMT 82 into an x-ray electrical current signal. This signal is converted to a voltage by amplifier 92. As described in greater detail in commonly assigned U.S. patent application Ser. No. 965,657, filed Oct. 23, 1992, inventor S. Dhurjaty, entitled "Noise Reduction in a Storage Phosphor Data Acquisition System", laser noise which is present in the x-ray image signal produced by PMT 82 is corrected by subtracting a reference signal detected by reference photodetector 68. The corrected digital signal is corrected for the light collection signature of light collector 80 by a correction lookup table in control 32. The correction lookup table is loaded during calibration of reader 10 when it is initially set up.

Patient identification and examination information are downloaded into reader 10 from a hand held bar code scanner 94 positioned in station 18 of reader 10. As each storage phosphor plate 24 is extracted from its cassette 22 cassette bar code reader 96 reads the bar code on plate 24. The image data and corresponding patient and exam information are correlated by control 32.

The physical size of the cassettes 22 containing the storage phosphor plates 24 are identical to that of conventional radiographic film/screen cassette sizes. Typically storage phosphor reader 10 is capable of reading the following storage phosphor plate sizes: 18×24 centimeters, 24×30 centimeters, 35×35 centimeters, and 35×43 centimeters. The raster pattern or matrix pixel size for each storage phosphor plate that can be processed is, for example, as follows: 18×24 cm-1792×2400; 24×34 cm-2048×2500; 35×35 cm-2048×2048; and 35×43 cm-2048×2500. It can be seen that as the storage phosphor plate decreases in size, the pixel size of the stimulating laser beam decreases in size. However, the decrease in laser beam stimulating area produces an emitted light image which also decreases in intensity. According to the present invention, in order to compensate for the decrease in emitted light level with a decrease in storage phosphor plate size, means are provided for detecting the size of the storage phosphor plate and changing the gain of amplification of the detected image x-ray signal as a function of the detected storage phosphor plate size.

Figure 4:
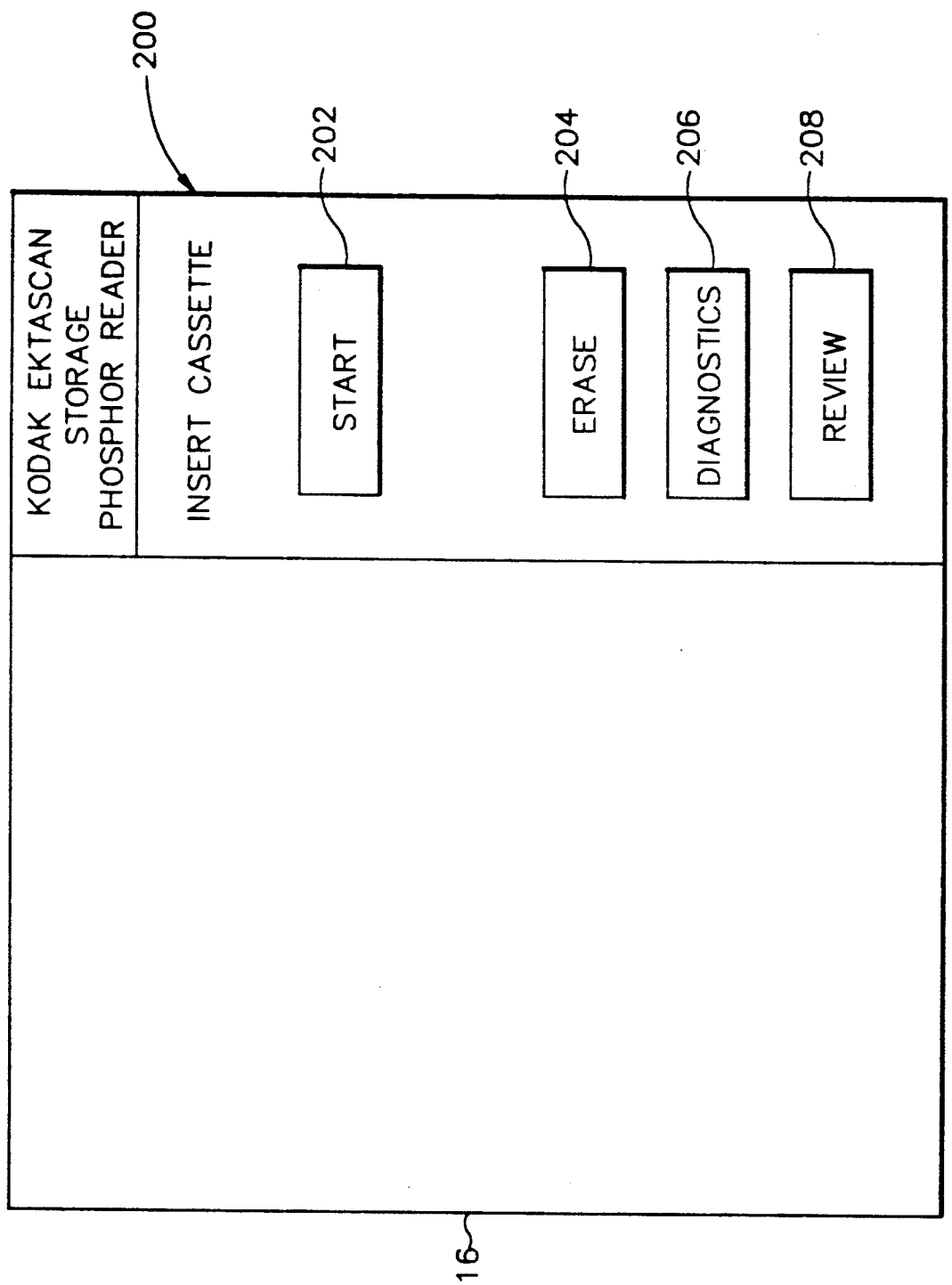
FIGS. 4 and 5 are diagrammatic views of touch screen displays for controlling the storage phosphor reader of FIG. 1.

Storage phosphor reader 10 has a user interface in touchscreen 16. A touch screen is a special kind of computer interface that allows a user to touch an area (or button) on the screen rather than using a mouse or keyboard. A particular function button can initiate the display of another menu. FIG. 4 diagrammatically illustrates the main menu 200 displayed on the right side of touch screen 16. On the left side is a display area for a scanned x-ray image. The main menu screen 200 includes the following graphical buttons: START button 202, ERASE button 204, DIAGNOSTICS button 206, and REVIEW button 208.

START button 202 is pressed to begin the image acquisition process after exam information has been downloaded into reader 10 from hand-held bar code scanner 94 and after loading a cassette 22 containing an exposed storage phosphor 24 into reader 10. After a storage phosphor 24 is scanned, it is automatically erased and returned to the cassette 22 for removal from reader 10. The scanned x-ray image can be viewed on touch screen 16 by pressing REVIEW button 208.

The user may have to erase a storage phosphor without scanning it. For example, if the user knows the x-ray exam stored in the storage phosphor is faulty and another exam has already been performed, the faulty storage phosphor must be erased before using it. Moreover, storage phosphors that have not been exposed in more than 24 hours should also be erased since idle storage phosphors can collect "noise" (i.e., latent signal level) which must be erased before using the storage phosphor again.

To erase a storage phosphor 24:
1. Insert the cassette 22 onto load platform 20.
2. Push download lever 26 to lock the cassette 22 in place.
3. Touch ERASE button 204.
4. After the storage phosphor 24 has been erased, remove the cassette 22 from reader 10.

Figure 5:
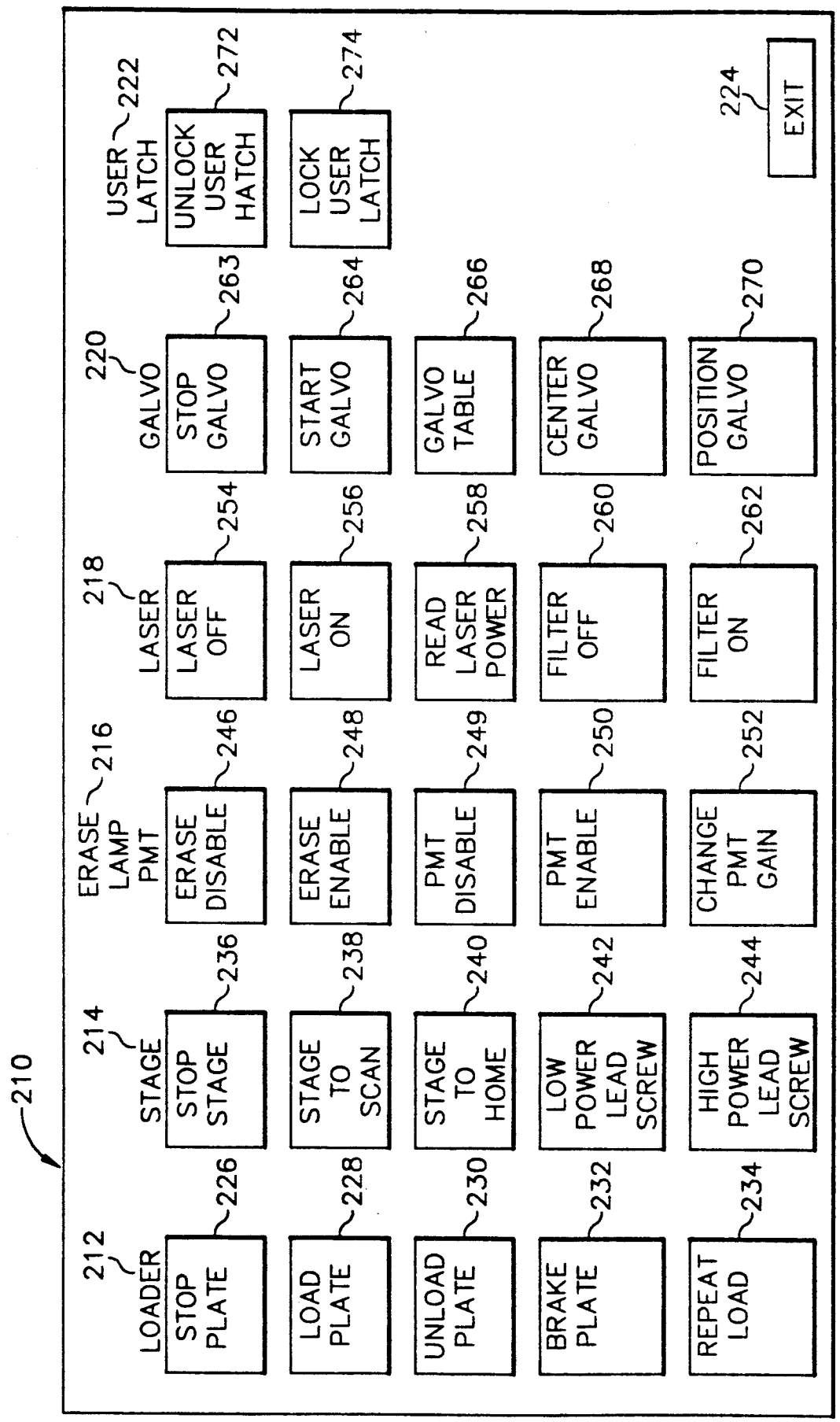

The DIAGNOSTICS screen button 206 is pressed to display diagnostic routines which are available for reader 10. The Diagnostics screen 210 shown in FIG. 5 is displayed on touch screen 16 of monitor 14. The Diagnostic function buttons 224-270 are grouped as follows: Loader group 212 includes buttons 226-234; Stage group 214 includes buttons 236-244; Erase Lamp, PMT group 216 includes buttons 246-252; Laser group 218 includes buttons 254-262; Galvo group 220 includes buttons 262-270; User latch group 222 includes buttons 272, 274; and Exit button 224.

Stop Plate button 226 allows the motion of the storage phosphor plate 24 to coast to a stop through control of extraction device 28.

Load Plate button 228 loads storage phosphor plate 24 into reader 10 through extraction of storage phosphor plate 24 from cassette 22 by extraction device 28.

Unload Plate button 230 inserts storage phosphor plate 24 into cassette 22 by extraction device 28.

Brake Plate button 232 applies a braking current to extraction motor 30 to immediately stop the motion of extraction device 28 and storage phosphor plate 24.

Repeat Load button 234 loads and unloads the storage phosphor plate 24 until Brake Plate button 232 or Stop Plate button 226 are pressed.

Stop Stage button 236 stops motion of translation state 34.

Stage To Scan button 238 moves translation stage 34 to the beginning of scan position.

Stage To Home button 240 moves the translation stage 34 to the home position.

Low Power Lead Screw button 242 causes stepper motor 50 to move translation stage 34 slowly by applying low power to stepper motor 50 which drives screw 48.

High Power Lead Screw button 244 causes stepper motor 50 to move translation stage 34 more rapidly by applying high power to stepper motor 50 which drives screw 48.

Erase Disable button 246 disables (turns off) erase lamp 88.

Erase Enable button 248 enables (turns on) erase lamp 88.

PMT Disable button 249 disables (turns off) PMT 82.
PMT Enable button 250 enables (turns on) PMT 82.

Change PMT Gain button 252 changes the gain of PMT 82.

Laser Off button 254 turns laser 56 off.

Laser On button 256 turns laser 56 on.

Read Laser Power button 258 reads the level of power applied to laser 56.

Filter Off button 260 removes a neutral density filter (not shown) from the path of laser beam 58.

Filter On button 262 places a neutral density filter (not shown) in the path of laser beam 58.

Stop Galvo button 263 stops galvo 74 driven mirror 72.

Start Galvo button 264 starts galvo 74 driven mirror 72.

Galvo Table button 266 accesses the servo table for driving galvo 74.

Center Galvo button 268 centers the galvo 74 driven mirror 72.

Position Galvo button 270 positions the galvo 74 driven mirror 72.

Unlock User Latch button 272 unlocks a user latch (not shown) that latches a cover of housing 12.

Lock User Latch button 274 locks a user latch (not shown) that latches a cover of housing 12.

Exit button 224 exits from Diagnostics Screen 210 to the Main Menu Screen 200.

The present invention finds use in medical diagnostic imaging equipment and particularly in storage phosphor readers which process storage phosphors storing latent medical x-ray images.

Although the invention has been described with reference to preferred embodiments thereof, it will be understood that variations and modifications can be effected within the spirit and scope of the invention as described above and as defined in the appended claims.

What is claimed is:

1. Storage phosphor reader apparatus comprising:
   a laser for producing a laser beam;
   scanning means for scanning said laser beam in a line scan direction across a storage phosphor which stores a latent x-ray image to produce an emitted light x-ray image;
   translating means for translating said storage phosphor in a page scan direction perpendicular to said line scan direction of said laser beam;
   storage phosphor loading means for loading and unloading a storage phosphor relative to said translating means;
   photodetector means for detecting said emitted light x-ray image and for producing a corresponding x-ray image signal;
   erasing means for erasing said storage phosphor after it is scanned;
   a video monitor for displaying said x-ray image signal; and
   control means for controlling said laser, said scanning means, said translating means, said storage phosphor loading means, said photodetector means and said erasing means; wherein said control means includes touch screen means on said video monitor for providing a user interface to said control means, and wherein said control means controls said touch screen means to initially display a main menu on said video monitor which includes, (a) a first user actuable button for initiating automatic operation of said laser, said scanning means, said translating means, said loading means, said photodetector means and said erasing means to produce an x-ray image signal from a latent x-ray image stored in a storage phosphor, and (b) a second user actuable button to sequentially display a diagnostic touch screen after said main menu screen, said diagnostic touch screen having user actuable buttons which are selectable to initiate diagnostic routines to selectively, individually control said laser, said scanning means, said translating means, said storage phosphor loading means, said photodetector means and said erasing means.

2. The apparatus of claim 1 wherein said main menu touch screen includes an image display area for displaying an x-ray image.

3. The apparatus of claim 1 wherein said laser can be turned on and off and wherein said diagnostic touch screen includes user actuable buttons for controlling said laser to be turned on and off.

4. The apparatus of claim 1 wherein said scanning means includes an oscillating mirror driven by a galvanometer which can be turned on and off and wherein said diagnostic touch screen includes user actuable buttons for controlling said galvanometer to be turned on and off.

5. The apparatus of claim 1 wherein said translating means includes a stage for supporting a storage phosphor and drive means for driving said stage in said page direction, and wherein said diagnostic touch screen includes user actuable buttons for controlling said drive means to move said stage and to stop said stage.

6. The apparatus of claim 1 wherein said diagnostic touch screen includes user actuable buttons for controlling loading and unloading a storage phosphor relative to said translating means.

7. The apparatus of claim 1 wherein said photodetector means can be enabled and disabled and wherein said diagnostic touch screen includes user actuable buttons for controlling said photodetector means to be enabled or disabled.

8. The apparatus of claim 1 wherein said erasing means can be enabled or disabled and wherein said diagnostic touch screen includes user actuable buttons for controlling said erasing means to be enabled or disabled.

* * * * *